Feb. 9, 1932.                L. ROYAK                1,844,796
                            WIND MOTOR
                       Filed July 16, 1928
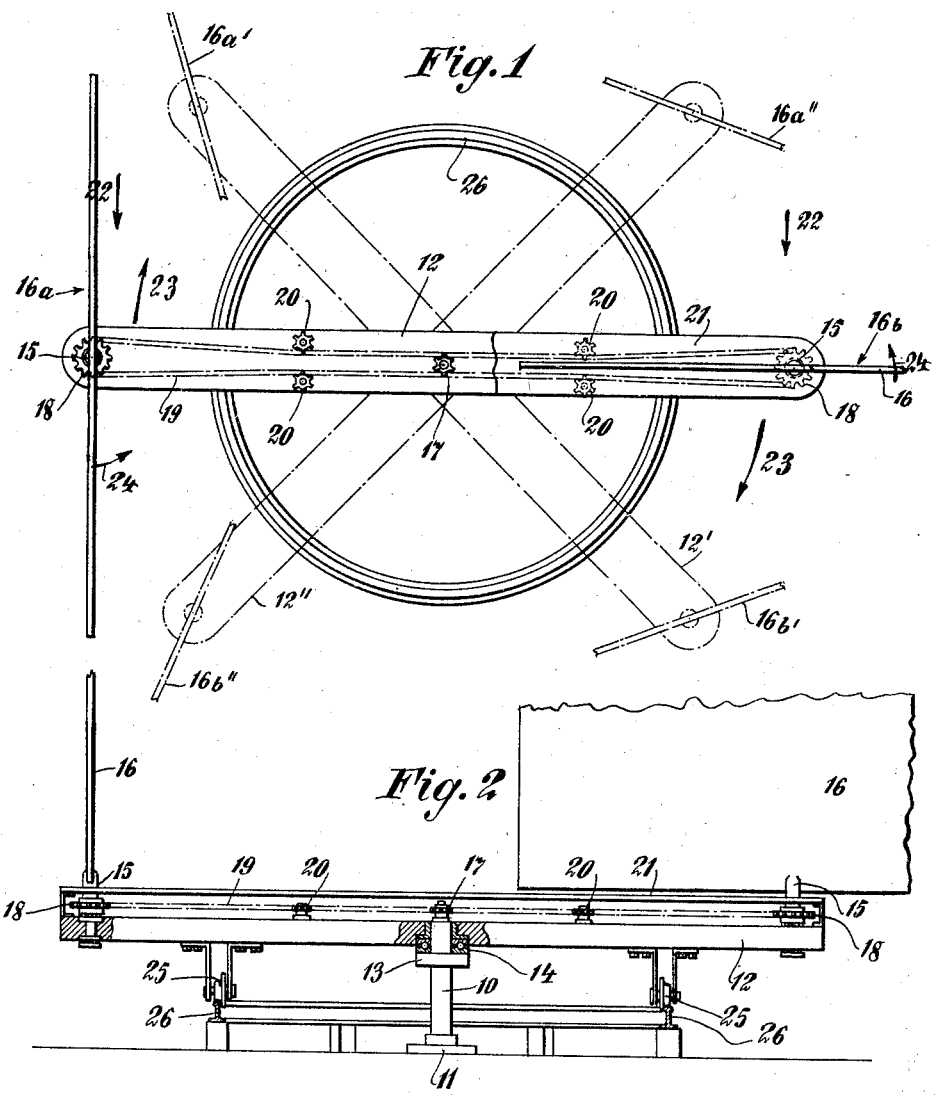
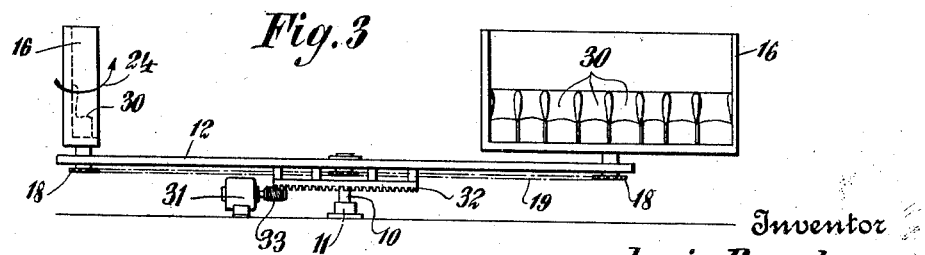
Inventor
Louis Royak,
By his Attorney Patented Feb. 9, 1932

1,844,796

UNITED STATES PATENT OFFICE

LOUIS ROYAK, OF NEW YORK, N. Y.

WIND MOTOR

Application filed July 16, 1928. Serial No. 293,176.

This invention relates to wind motors and has for its main object to provide a wind motor of novel construction wherein comparatively large plates or blades are exposed to the wind and receive its force to drive a shaft.

Another object of my invention is to provide a device of the mentioned character wherein the blades or plates are made rotatable in respect to the shaft driven by them and will always tend to offer a larger surface to the wind at the one side of said shaft than at the other so as to have a surplus of power or momentum on the one side of said shaft as against the other and thereby induce a rotation of the element carrying said blades or plates.

Still another object of my invention is to provide a device as characterized hereinbefore which will be simple in construction, inexpensive to manufacture and to operate, reliable in operation, and in which the said blades or plates have such intercommunication that they will automatically turn one another in the positions desired by the operation of the device.

A further object of this invention is to provide a game device of novel, amusing and interesting character based on the principle of this wind motor.

Other objects of the invention will be apparent as the specification of the same proceeds.

Features of the invention include a stationary shaft, preferably secured in a vertical position, a rotatable beam like element around said shaft carrying plates or blades in rotatable pins therein, said blades being exposed to the wind and transmitting its force to said rotatable element, said shaft and said pins carrying gears secured thereon and connected with an endless chain engaging each of them so that the turning of said rotatable element under the wind pressure will cause said chain to turn said pins and the blades thereon and cause said blades to offer a larger surface against the direction of the wind at the one side of said shaft than to the other side thereof.

In order that its construction and operation may be readily comprehended, I will now proceed with a full, clear and specific description of the invention, having reference to the accompanying drawings, which show an approved embodiment thereof as well as a modification for an amusement game purpose, and in which:—

Fig. 1 is a plan view of my wind motor, portions of it being broken away,

Fig. 2 shows a partly sectional side elevation of the same, and

Fig. 3 is a semi-diagrammatical showing of an amusement game, based on the principle of my wind motor.

Like reference characters mark the same parts wherever they occur in the drawings.

Referring to the drawings specifically and with characters of reference, the numeral 10 indicates a vertical shaft secured in the ground, as at 11. A beam 12 is rotatably arranged around the upper portion of the shaft 10, resting on a collar 13 integral with or secured on the shaft 10, and an antifriction ball bearing 14 may be interposed between the collar and the beam to transmit the weight of the rotatable element to the shaft and to reduce the friction between the two Upstanding pins or short vertical shafts 15 are rotatably arranged at the outer ends of the beam 12, and comparatively large plates or blades 16 are secured to the upper ends of said pins 15.

The upper end of the stationary central shaft 10 carries a gear or sprocket wheel 17 secured thereon and stationary therewith, while corresponding sprocket wheels 18 are secured on the pins 15 and are rotatable with them. An endless chain 19 goes around the sprocket wheels 18 and is kept in a taut condition. Said chain is also in engagement with the stationary central sprocket wheel 17, and since the outer wheels are twice the diameter of the central wheel, for a reason to be explained presently, idlers 20 are arranged on the beam 12 to force the chain 19 into steady engagement with said central wheel. A protecting board 21 also may be employed over the wheels and chain, to make them operate in a closed box like structure.

The operation of my device is as follows:

The blades 16 are set up in such a manner that at their extreme outward positions, indicated by 16a and 16b in Fig. 1, one will be perpendicular to the direction of the beam 12, while the other will be parallel therewith. Supposing that the wind blows in the direction indicated by the arrows 22, the plate 16b will receive the force of the wind at its entire surface, while the blade 16a will turn towards the wind with its edge and will receive practically no wind force. This will start the beam 12 to turn around the shaft 10 in the direction of arrow 23.

The turning of the beam 12 around the shaft 10 will cause the taut chain 19 to play around the stationary wheel 17 its successive links disengaging and engaging successive teeth of the sprocket wheel 17, which however cannot be done except if its respective links can play in and out of the teeth of the outer rotatable wheels 18, which again is possible only if said wheels are set into rotation a tooth every time one new tooth is disengaged and another one engaged in the center wheel 17. The result will be that the said wheels 18 will turn around while the beam 12 rotates in said beam with an identical peripheral velocity to the velocity of the chain over the central gear 17. Since the outer wheels are twice as large in diameter and have twice as many teeth than the central stationary wheel, they will turn one quarter circle, while the beam will make half of a revolution, therefore plate 16b will take up the position of 16a in relation to the beam 12, and vice versa, during one half revolution, and now 16a will receive the full force of the wind, again on the right-hand side of shaft 10, while plate 16b will show its edge to the wind direction and will receive no power, at the left hand side of the shaft 10. After another half turn of the beam 12, the situation will again be the same as shown in Fig. 1, the blades 16 having turned another quarter revolution only, and the wind momentum will again be on the right hand side of the beam 12. It will, therefore, be seen that in their extreme positions the blades 16 will always act in such a manner that they receive the wind power on the right hand side of the shaft 10 and will keep the beam 12 in rotation in the direction of arrow 23.

Two intermediate positions of the beam 12 are indicated in the dotted positions 12′ and 12″ of Fig. 1. The direction of rotation of the blades 16 is indicated by the arrows 24 and the position of the two blades in the positions 12′ and 12″ of the beam 12, is indicated by 16a′, 16b′, and 16a″ and 16b″, respectively. It will be seen by observing the drawings that there will always be an excess of momentum on the right hand side of shaft 10 and the beam 12 will be kept in a steady rotation under the influence of the wind 22.

This rotation of the beam 12 may be transmitted for any useful purpose by any of the usual means, well known in the art. (Not shown.)

In order to steady the movement of the beam 12, I also may employ rollers 25 secured thereunder and running on a circular rail path 26. Similar roller arrangements may be provided for in larger installations for the blades 16 playing on a circular path carried by the beam 12 itself.

In Fig. 3, I show an application of the basic principle of my device to a novel amusement game. The construction of this device is entirely identical with the one described herinbefore, but the plates 16 carry seats 30 on which persons may seat. The force of the wind will slowly start the beam 12 into rotation and will cause the plates 16 with the seats 30 and the persons occupying them to rotate around in the direction of arrows 24. Two full rotations of the beam 12 will result in one full turn of the plates 16 and will give the persons occupying the seats thereon a view in every direction.

Since it is not desirable to make such an amusement game depend on the wind, I may further add thereto an independent driving force, as for instance the electric motor 31 operating a gear 32 secured to the underside of the beam 12, preferably through a worm 33.

Changes and variations may be made in the arrangements, combinations and constructions of the parts, within the limits of the appended claim, without departing from the spirit and scope of the invention.

What I claim as new, is:—

In a wind motor, in combination, a stationary vertical shaft; a horizontal beam rotatable therearound; a vertical shaft rotatably journalled at each end of said beam; a second beam superposed above said first beam spaced apart therefrom, said shafts also being rotatably journalled in the ends of said second beam; a vane secured to the end of each rotatable shaft above said second beam, rotatable with said shaft, the planes of the two vanes being set at right angles to each other; a stationary sprocket wheel secured on the upper end of said stationary shaft between said two beams and a rotatable sprocket wheel secured to each of said rotatable shafts between said two beams; a taut endless chain meshing with said three sprocket wheels; rotatable guide sprocket wheels between said beams to keep said chain in steady engagement with said three sprocket wheels, the two outside sprocket wheels on the rotatable shafts being twice the diameter of said stationary center sprocket wheel.

Signed at New York, in the county of New York, and State of New York, this 12th day of July, A. D. 1928.

LOUIS ROYAK.